United States Patent [19]

Weirich et al.

[11] Patent Number: 4,718,458

[45] Date of Patent: Jan. 12, 1988

[54] DISTRIBUTORS FOR PRESSURE FLUID CONTROL SYSTEM IN MINERAL MINING INSTALLATIONS

[75] Inventors: Walter Weirich, Dortmund; Bernd Peters, Dülmen, both of Fed. Rep. of Germany

[73] Assignee: Gewerkschaft Eisenhutte Westfalia GmbH, Fed. Rep. of Germany

[21] Appl. No.: 3,956

[22] Filed: Jan. 16, 1987

[30] Foreign Application Priority Data

Jan. 24, 1986 [DE] Fed. Rep. of Germany ....... 3602023

[51] Int. Cl.$^4$ ............................................. F16L 39/02

[52] U.S. Cl. .................................... 137/884; 137/271; 285/137.1; 285/305

[58] Field of Search ................... 137/271, 561 R, 884; 285/131, 137.1, 305

[56] References Cited

U.S. PATENT DOCUMENTS

| | | | |
|---|---|---|---|
| 2,943,868 | 7/1960 | Hanback | 285/131 X |
| 3,538,940 | 11/1970 | Graham | 285/305 X |
| 3,934,605 | 1/1976 | Jegris | 137/271 |
| 4,378,027 | 3/1983 | Weirich et al. | 137/884 X |
| 4,536,017 | 8/1985 | Weirich et al. | 285/137.1 |
| 4,555,130 | 11/1985 | McClain | 285/305 X |

*Primary Examiner*—A. Michael Chambers
*Assistant Examiner*—John C. Fox
*Attorney, Agent, or Firm*—Samuels, Gauthier et al.

[57] ABSTRACT

A distributor block for interconnecting a hose bundle to a control device of a pressure fluid control system in an underground mine working has internal passageways for connecting valves of the device to individual hoses. Bores in the block receive detachable elongate coupling members which themselves have internal bores and plugs for engaging in sockets within the control device. The coupling members are journalled in the block for slight transverse and angular movements within seals.

18 Claims, 6 Drawing Figures

DISTRIBUTORS FOR PRESSURE FLUID CONTROL SYSTEM IN MINERAL MINING INSTALLATIONS

FIELD OF THE INVENTION

The present invention relates in general to hydraulic or pneumatic pressure fluid control systems for mineral mining installations in underground mine workings and more particularly to a distributor for interconnecting flexible hoses to a control device employing control valves.

BACKGROUND TO THE INVENTION

In a conventional form of control system for controlling the operation of various pressure fluid consumer appliances such as piston and cylinder units, hydraulic props and shifting rams in a mineral mining installation there are numerous flexible hoses arranged as bundles or clusters within flexible protective sheaths. The hose bundles have plug-in coupling devices to permit detachable connection with other components such as the appliances and control devices with valves which control the flow of the pressure fluid. For safety reasons, it is normal to have the controls for a roof support installed on the next adjacent roof support so that for example an operator can be protected while hydraulic props are operated to raise or lower the roof caps of the supports. As control devices it is known to use assemblies of valve blocks with a number of control valves actuated with manually-operable levers or push-buttons or rotary controls (see DE-OS No. 2 038 661 which has an equivalent U.S. Pat. No. 3,821,880). It is known to utilize distributors to connect the control devices to the hose bundles and DE-OS No. 3 012 291, DE-OS No. 3 014 927 and DE-OS No. 3 003 065 describe known forms of distributors. These distributors are normally connected to the control devices with bolted connections and it is then essential to seal mating faces of the distributors and the control devices against the high pressure of the fluid. A distributor is also known from DE-OS No. 3 216 553 which has an equivalent GB No. 2 119 885) which employs a clamping plate arrangement to lock with the control device and plug-in nipples which mate with sockets in the control device as well as an adaptor to mate with one of the hose bundles. The connection of the prior art distributors with the control devices frequently presents problems due to manufacturing tolerances and this is especially the case with the plug-in nipples and sockets which necessitates high precision and consequently high costs.

A general object of the present invention is to provide an improved form of distributor.

SUMMARY OF THE INVENTION

A distributor in accordance with the invention has one interface for coupling to a hose bundle and another interface connectible with plug-in connections to a control device employing valves. The distributor takes the form of at least one block with internal ducts or passageways leading between the interfaces which are defined by planar faces of the block. In accordance with the invention, coupling pieces or members are mounted within bores in the block for limited movements and are sealed with respect to the bores. The coupling members then form part of the plug-in connections and have internal bores constituting part of the ducts. The coupling members are of robust construction and because of the flexibility of their mountings they are able to take up manufacturing tolerances and mate reliably with complementary parts of the plug-in connections of the control device. Only a relatively small freedom of movement for the coupling members is necessary—typically a few tenths of a millimeter will suffice. Sealing rings can surround the coupling members and seal against internal faces in the block in a manner to permit the flexible adjustment of the coupling members. Such a construction is well able to cope with the high pressures of the fluid. The manufacturing cost of the distributor can be relatively low because precise tolerances are not vital. The coupling members are readily accessible for release from the block should damage occur or should seals need replacement.

In one preferred design, the coupling members or bolts have plugs at one end which mate in sockets in the control device to constitute the plug-in connections and a screw threaded connection is used to secure the members in place. The coupling members themselves are fitted by simply pushing them into the bores. Conveniently, U-shaped clamps fitted to the control device may lock the plug-in connections between the control device and the distributor and additional bolted connections are unnecessary. The U-shaped clamps may fit in grooves in the plugs at the ends of the coupling members.

Conveniently, the coupling members may project from an opposite face of the block remote from the control device and containing the reception bores. In this case the interfaces contain faces of the block which are offset as by 90° from one another. The ends of the coupling members remote from the plug-in connections at the interface with the control device may then be adapted to accept nuts which serve to tighten the members in the bores against the seals. As the nuts are tightened, the seals may be squeezed against counter-bore shoulders defining enlarged end regions of the bores in the block, for example, with the end of a flange at the plug end region of the member and a collar of the nut.

Each coupling member is itself partially hollow preferably with axial and transverse bores which lead from the plug-in connections to chambers between the bores and the exterior of the member which is reduced in cross-section. Additional bores in the block may lead from the chambers to the interface for the hose bundle. Here an array of sockets or openings in a face of the block can mate with hose plugs of a terminal coupling of the hose bundle. A nut on the terminal coupling can screw onto a threaded tube on the face of the block surrounding the array of openings.

Although a single block can embody a distributor according to the invention it is possible to adopt several blocks generally constructed as described above and to connect an intermediate block therebetween with fixing bolts. The intermediate block may then have connectors for receiving hoses or conduits leading to the pressure fluid feed line and return line and to control lines and may connect with the ducts in the distributor blocks.

The invention may be understood more readily, and various other aspects and features of the invention may become apparent, from consideration of the following description.

BRIEF DESCRIPTION OF THE DRAWINGS

Embodiments of the invention will now be described, by way of examples only, with reference to the accompanying drawings, wherein.

DESCRIPTION OF THE PREFERRED EMBODIMENTS

Figure 1:
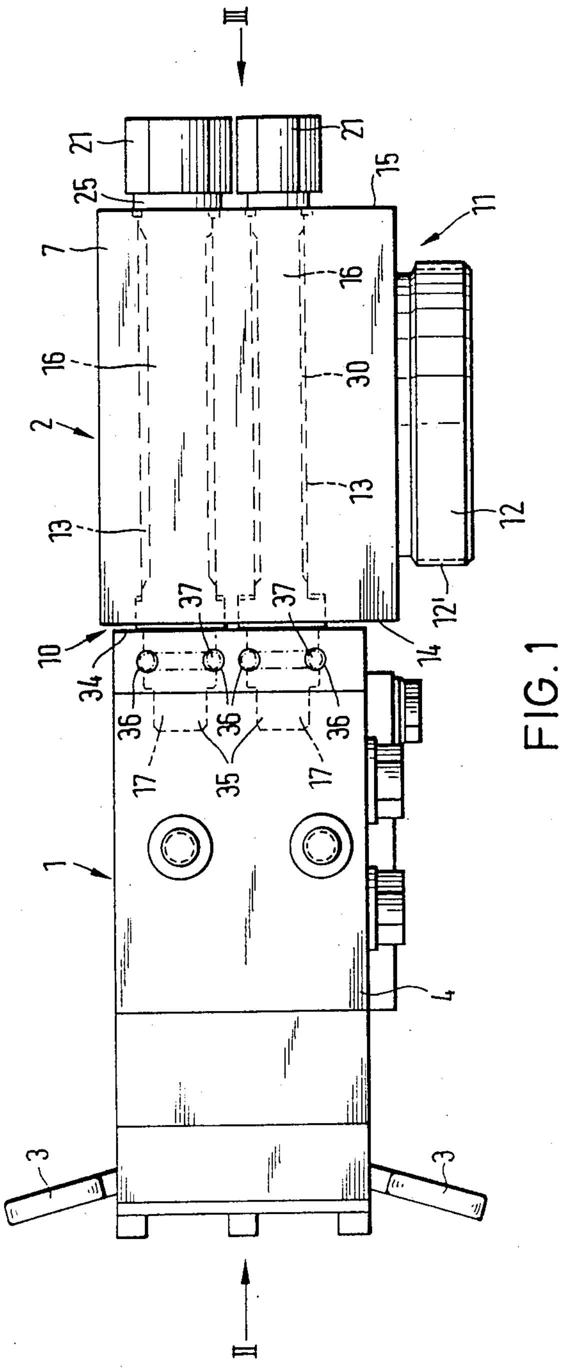
FIG. 1 is an elevation of the control unit composed of a control device a distributor apparatus constructed in accordance with the invention.

The unit illustrated in FIG. 1 is composed of a constructional assembly with a control device 1 and distributor apparatus 2 detachably connected therewith. The distributor apparatus 2 serves to establish connection between the control device 1 and one or more hose bundles of known type. The hoses are not shown in FIGS. 1 to 5 but FIG. 6 depicts a typical application of the unit in which the hose bundles are designated 60, 61. As shown the unit 1, 2 is mounted beneath the roof cap 62 of a roof support 63. The support 63 has a floor structure 64 with one or more hydraulically extendible props 65 disposed beneath the floor structure 64 and the cap 62. A goaf shield 66 has a "lemniscate" guide linkage 67 to connect the rear end portion of the cap 62 to the floor structure 64 in known manner. The support and any ancilliary equipment utilizes a number of pressure fluid consumer appliances controlled by a similar unit 1, 2 on an adjacent support. These appliances will thus connect with the individual hoses of the hose bundles similar to those designated 60 and 61 and the hoses of the bundles 60, 61 would lead to the consumer appliances of an adjacent roof support.

Figures 2, 3:
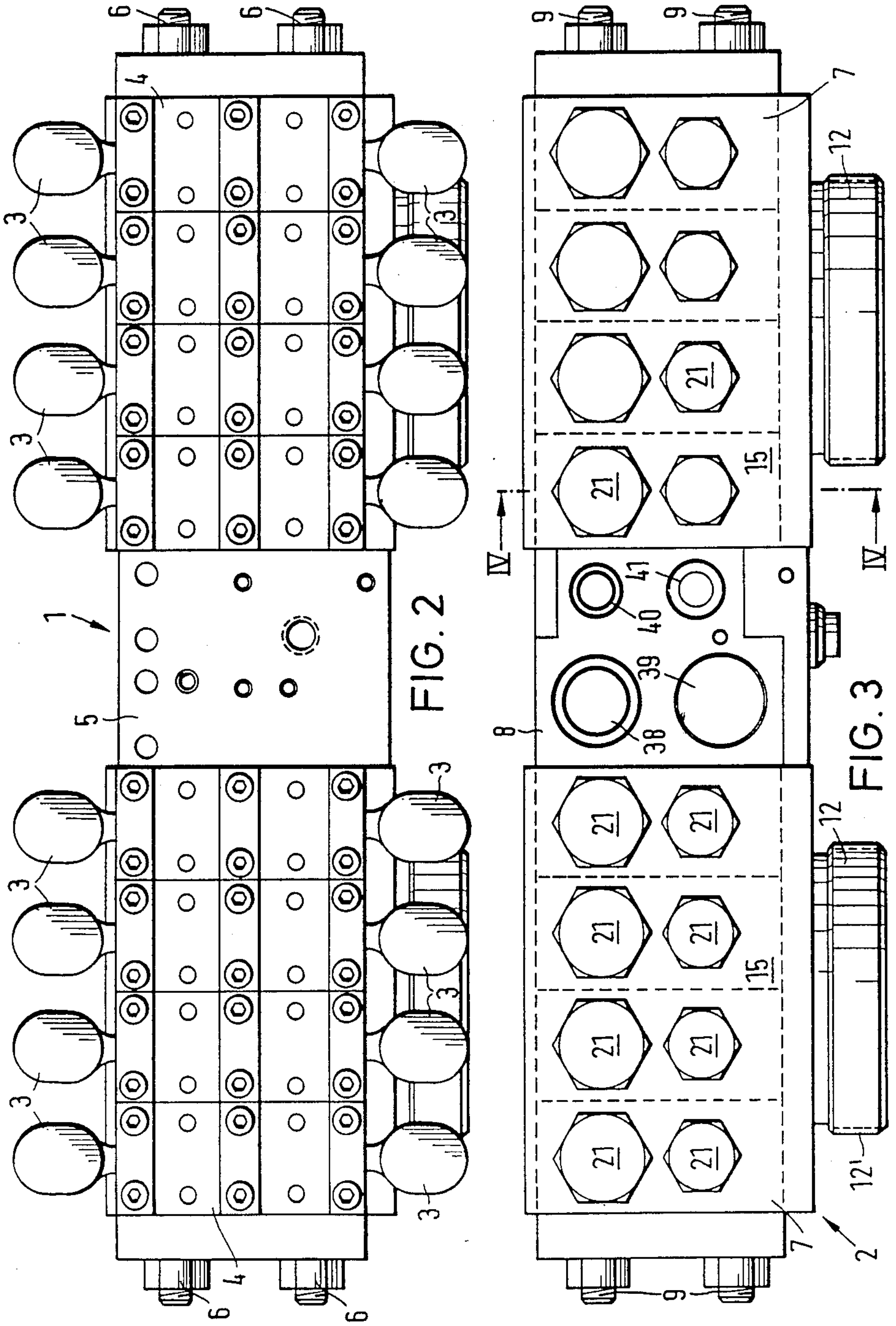
FIG. 2 is a view of the control device of the unit as seen in the direction of arrow II in FIG. 1.
FIG. 3 is a view of the distributor of the unit as seen in the direction of arrow III in FIG. 1.

The control device 1 is itself composed of a number of value units each of which has a number of individual multi-way valve assemblies in blocks assembled side-by-side. The valves of the device 1 are operated by banks of pivotable levers 3 accessible beneath the roof cap 62. Control devices of this type are described for example, in DE-OS No. 3 012 291 and DE-OS No. 3 014 927. The number of multi-way valve blocks combined in the valve units depends upon the number of hydraulic consumer appliances which are to be controlled but in the illustrated example the device 1 is composed of two identical generally rectangular valve units each composed of four likewise generally rectangular valve blocks 4 as shown in FIG. 2. The valve units composed of the valve blocks 4 are connected together via an intermediate unit 5 to form the control device 1 and the connection is effected by means of bolts 6 passing through holes in the blocks 4 and the intermediate unit 5.

The distributor 2 is also of multi-part form. It likewise consists of two identical blocks 7 which are connected together with the aid of an intermediate block 8 and by means of bolts 9 which secure the blocks 7, 8 together. As shown in FIG. 3, connectors 38, 39 for connecting with the main pressure line and the main return line and also other optional connectors 40, 41 for connection with one or more control lines are provided on the intermediate block 8. It is not essential that the distributor 2 be composed of a number of blocks assembled in this manner and the distributor 2 may consist of a single block 7. In this case, references hereinafter to the individual blocks 7 would apply to the single distributor block 7. Each block 7 of the distributor 2 is a generally rectangular metal component containing internal ducts leading to openings in exterior connection interfaces 10 and 11 at right-angles to one another. The connection interface 10 establishes connection with the control device 1 while the connection interface 11 establishes connection by way of a detachable coupling with a hose bundle 60, 61. As shown in FIG. 5, the part of the coupling on the block 7 takes the form of a short pipe or tube 12 with an array of sockets 33 in a plane face of the block 7 disposed inside the pipe 12 in a protected manner. The tube 12 has an external screw-thread 12' which receives a clamping nut mounted on the end of the associated hose bundle and permitting the hose bundle to be screwed in place to bring a plurality of plug-pins at the ends of the hoses into mating engagement with the sockets 33.

Figure 4:
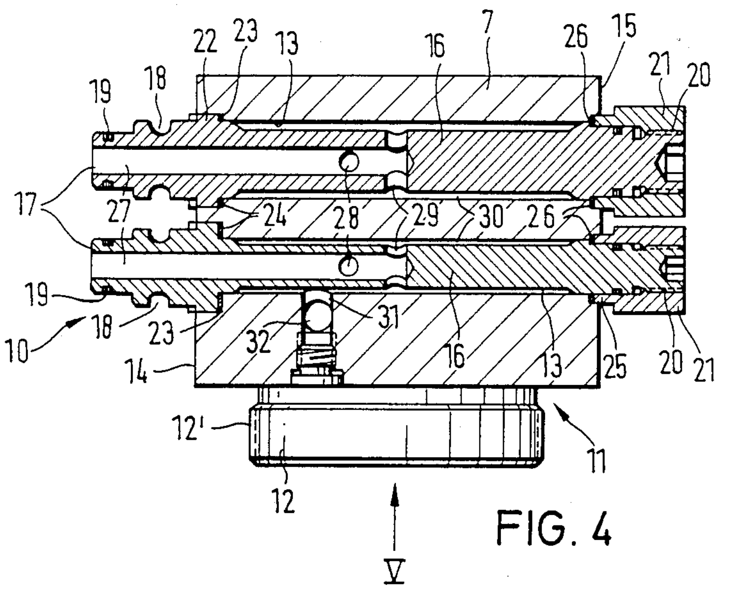
FIG. 4 is a cross-section through one of the distributor blocks taken along the line IV—IV in FIG. 3.
Figure 5:
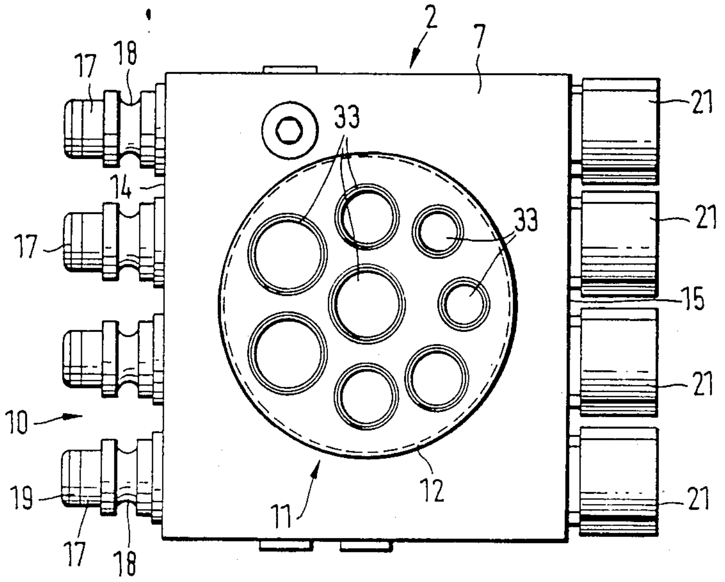
FIG. 5 is a view of the distributor block taken in the direction of arrow V in FIG. 4.
Figure 6:
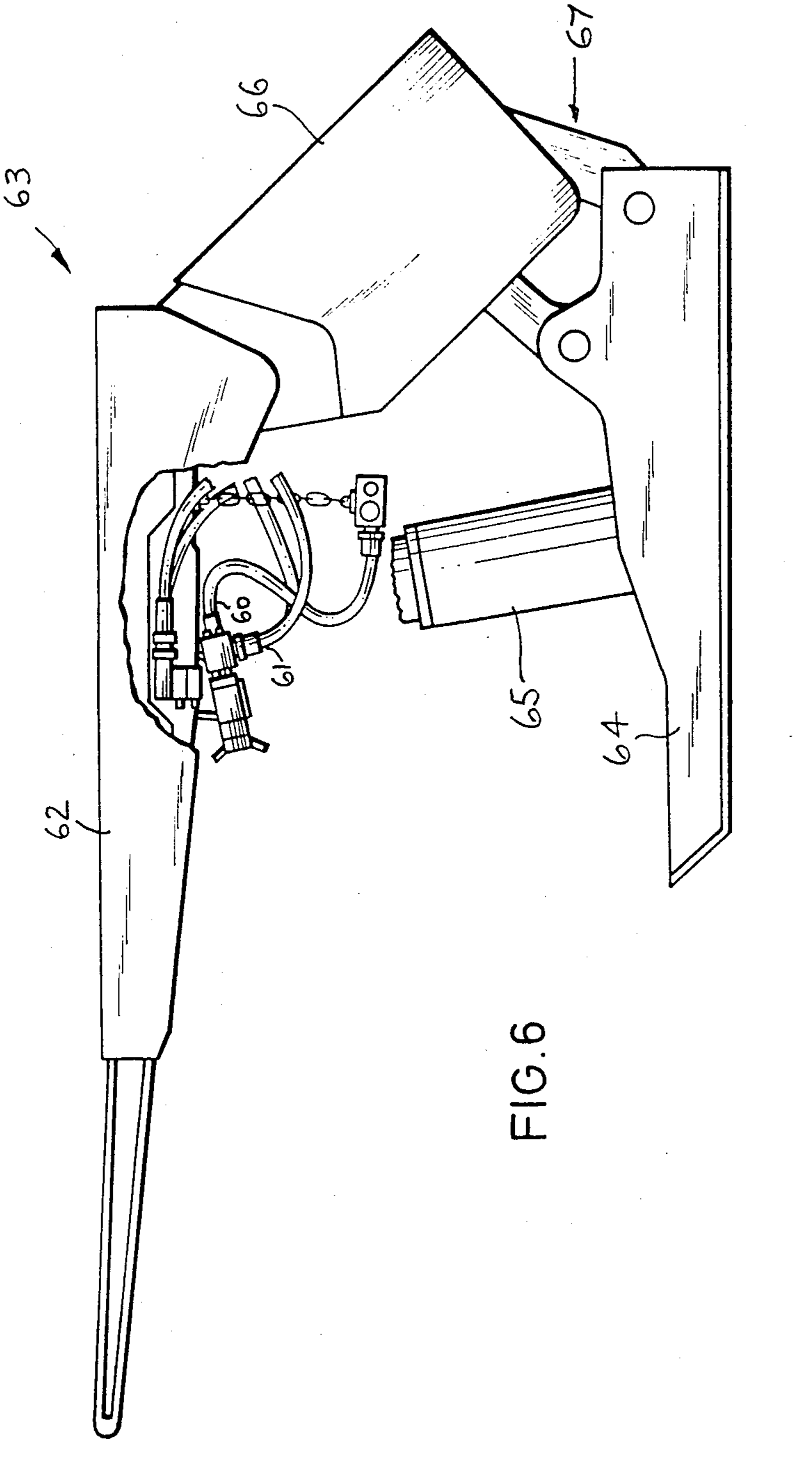
FIG. 6 depicts a roof support equipped with the unit shown in FIGS. 1 to 5.

As can be seen especially in FIGS. 4 and 5, each distributor block 7 has two rows of bores 13 which extend from a planar face 14 of the interface 10 to an opposite planar face 15. The bores 13 have enlarged counter-bored end regions penetrating the faces 14, 15. Push-in coupling members 16 are received within the bores 13. The coupling members or bolts 16 project at both ends from the bores 13 with the end of each member 16 projecting from the face 14 being shaped as a spigot or trunnion-like plug or nipple 17. The plugs 17 correspond to the individual valve blocks 4 of the device 1. Each plug 17 is equipped with a circumferential groove 18 and a sealing ring 19 seated in a further groove is disposed outwardly from the groove 18. Inwardly of the groove 18, the bolt 16 has a flange 22 by which it bears on a resilient sealing ring 23 which abuts against a shoulder face 34 of the end region of the associated bore 13. The opposite end region of the coupling members 16 remote from the plugs 17 project from the bores 13 in the face 15 and are equipped with external threads 20 onto which nuts 21 are screwed. The nuts 21 each have an external hexagonal form and an annular collar 25 which engages in the enlarged end region of the associated bore 13 to engage on a resilient sealing ring 26 which abuts against a shoulder face of the enlarged bore end region. As can be appreciated, the nuts 21 permit the coupling members 16 to be tightened to reliably seal-off the bores 13 from the exterior with the aid of the sealing rings 23, 26. The coupling members 16 are partially hollow with axial bores 27 and transverse or radial bores 28, 29 for passing pressure medium. The axial bore 27 in each member 16 extends through the plug 17 and leads via the bores 28, 29 into the space between the seals 24 and 26 where the coupling member 16 is reduced in diameter to form a chamber 30 with the interior of the bore 13. Each chamber 30 is itself connected to further bores 31, 32 in the block 7 which lead to the sockets 33 of the hose connection interface 11 as shown in FIG. 5. FIG. 3 shows that the coupling members 16 and the bores 13 in the rows have differing diameters in order to provide pressure medium passages of different flow cross-sections. The bores 27, 28, 29, 31 and 32 constitute in conjunction with the chambers 30 the internal ducts of the distributor block by means of which the individual connections between the control device 1 and the hoses of the hose bundles are established.

As shown in FIG. 1 the valve units composed of the blocks 4 of the control device 1 each defines a plane connection interface 34 in which there are socket openings 35 each adapted to receive one of the plugs 17 of the coupling members 16 of the associated distributor block. The socket openings 35 are likewise disposed in two parallel rows. The seals 19 seal against the interiors of the socket openings 35. Additional bores 36 are provided in the valve blocks 4 to intersect the socket openings 35 therein perpendicularly. To lock the distributor blocks 7 to the control device 1 the plugs 17 of the members 16 are introduced into the socket openings 35 and U-shaped clamps of known type are introduced from the outside into the bores 36 so that the arms of the clamps lie in the grooves 18 and thus secure the plugs 17 in place.

The coupling members 16 are mounted to have a slight clearance in the bores 13 and the provision of the resilient sealing rings 23, 26 which surround the members 16 tightly inherently permit the members 16 to execute slight movements transversely to their axes and also slight angular movements relative to their axes. Thus a certain freedom of movement exists between the coupling members 16 and their plugs 17 in relation to the sockets 35 and when the components are manufactured precise tolerances are not necessary.

It is not essential that the members 16 have the plugs or nipples 17 to mate with the control device 1, indeed it is also possible, although possibly less desirable, to reverse the roles so that the coupling members 16 at the ends of the connection interface 10 define axial bores which form the socket openings for receiving plugs or nipples now mounted on the valve blocks of the control device 1.

It is also not essential that the coupling members 16 project from the bores 13 at the face 15. The members 16 can instead be secured within the interior of the bores 13 by means of nuts disposed within end regions of these bores 13. In this case where the coupling members 16 do not project beyond the face 15 of the block, the interface 11 may be formed on the distributor block face 15 instead being perpendicular thereto.

In order to connect the hydraulic consumer appliances pertaining to the roof support 63 to the hose bundles 60, 61 of an adjacent roof support equipped with the unit 1, 2, a further distributor block 7 similar to that described above can be used.

We claim:

1. In a pressure fluid control system for an underground mineral mining installation; said system employing distributor apparatus having one interface provided with means for coupling the apparatus to a bundle of hoses, another interface connectible via means employing plug-in connections to a control device with valves for controlling the flow of pressure fluid and internal passages providing connections between the interfaces, the improvements comprising:

the apparatus is composed of at least one block with external faces defining the interfaces, bores are provided in the block, elongate coupling members are mounted in the bores in the block, the coupling members themselves forming part of the plug-in connections and containing bores constituting part of said internal passages, and sealing means seal the coupling members with respect to the bores in the block and permit limited movement of the coupling members within the bores.

2. Distributor apparatus according to claim 1, wherein the coupling members take the form of push-in threaded bolts.

3. Distributor apparatus according to claim 1, wherein end regions of the coupling members project from the bores at one planar face of the block and are shaped to form plugs which are receivable in socket openings in the control device, the plugs and socket openings forming the plug-in connections.

4. Distributor apparatus according to claim 3, wherein the plugs are provided with circumferential grooves for receiving U-shaped clamping devices which lock the plugs in the socket openings.

5. Distributor apparatus according to claim 1, wherein the coupling members are each provided with axial and transverse bores which extend from one end region of the member which projects from one face of the block which constitute said one interface to terminate within the associated bore in the block and means is provided for detachably securing the ends of the coupling members remote from said one, interface to the block.

6. Distributor apparatus according to claim 1, wherein the bores in the block which receive the coupling members extend between one planar face of the block which constitutes said one interface at least in part and an opposite planar face, the coupling members extend through the entire length of the bores in the block and means is provided to secure the coupling members to the block at end regions of the members remote from said one interface.

7. Distributor apparatus according to claim 1, wherein the interfaces are defined by planar faces of the block which are offset angularly from one another.

8. Distributor apparatus according to claim 1, wherein each coupling member has an internal passage and is spaced from the interior of the associated bore in the block and between a pair of sealing rings to provide a chamber which leads via the passage in the coupling member to the one interface and via further bores in the block to the other interface.

9. Distributor apparatus according to claim 1, wherein each coupling member has a flange which bears against an internal shoulder within the block and the sealing means includes resilient sealing rings surrounding the coupling members and disposed between the flanges and the shoulders.

10. Distributor apparatus according to claim 9, wherein the flanges are disposed in the vicinity of said one interface and the coupling members are secured to the block at the ends remote from the one interface by means of screw-threaded connections which serve to draw the flanges against the sealing rings and the shoulders.

11. Distributor apparatus according to claim 10, wherein the screw-threaded connections comprise nuts engaged with threaded end portions of the coupling members.

12. Distributor apparatus according to claim 11, wherein the end portions of the coupling members are provided with external screw-threads and project out from the bores.

13. Distributor apparatus according to claim 11, wherein the sealing means includes resilient sealing rings which surround the coupling members and are disposed between internal shoulders of enlarged end regions of the bores and collars of the nuts.

14. Distributor apparatus according to claim 1, wherein the other interface is composed of a planar face of the block in which there are socket outlets generally surrounded by a threaded tube which provide the coupling means in conjunction with a nut on the end of the bundle of hoses having plugs engageable within the sockets.

15. In a fluid control system for use in an underground mine working; a unit comprising a control device composed of individual valve blocks with manually-operable means assembled together in at least one block and a distributor for connecting the device to at least one hose bundle leading to appliances to be controlled, the distributor comprising at least one block with planar faces forming interfaces for connection to the control device and the hose bundle respectively, the block containing internal ducts and bores provided with seals, coupling pieces mounted within the seals in the bores for limited movements, the coupling pieces having passageways therein and end regions which mate as plug-in connection with complementary components of the control device at one of the interfaces, the end regions leading via the passageways in the coupling pieces and the internal ducts in the block to another interface equipped with means for detachable interconnection with the hose bundles.

16. A unit according to claim 15, wherein the distributor comprises a pair of said blocks which are connected together via an intermediate block equipped with ducts leading to some of the ducts in the blocks and connectors for connection to at least a pressure fluid line and return line of the system.

17. A unit according to claim 15, wherein the bores in the block are disposed in rows, the valve blocks have socket openings likewise disposed in rows at said one interface and the end regions of the coupling pieces project outwardly beyond the block and take the form of plugs insertable into the socket openings.

18. A unit according to claim 17, wherein the valve blocks have additional bores intersecting the socket openings, the plugs of the coupling pieces have sealing rings and grooves spaced from the sealing rings and detachable clamping means are inserted in the bores in the valve blocks to engage in the grooves of the plugs to lock the coupling pieces to the control device.

* * * * *